(12) United States Patent
Tillotson

(10) Patent No.: US 6,667,814 B1
(45) Date of Patent: Dec. 23, 2003

(54) AUTOMATIC UP IMAGE PRINTING

(75) Inventor: Timothy Wayne Tillotson, Georgetown, KY (US)

(73) Assignee: Lexmark International, Inc., Lexington, KY (US)

( * ) Notice: Subject to any disclaimer, the term of this patent is extended or adjusted under 35 U.S.C. 154(b) by 0 days.

(21) Appl. No.: 09/396,668

(22) Filed: Sep. 15, 1999

(51) Int. Cl.[7] .............. G06F 15/00; G06K 1/00; G09G 5/00
(52) U.S. Cl. .......... 358/1.15; 358/1.1; 358/1.9; 358/1.11; 345/841
(58) Field of Search ............ 358/1.13–1.115, 358/8; 345/841

(56) References Cited

U.S. PATENT DOCUMENTS

| 4,342,052 A | 7/1982 | Rackley et al. |
|---|---|---|
| 4,495,561 A | 1/1985 | Matsuura et al. |
| 5,051,843 A | 9/1991 | Hayashi |
| 5,144,452 A | 9/1992 | Abuyama |
| 5,146,343 A | 9/1992 | Fujii |
| 5,191,429 A * | 3/1993 | Rourke ............ 358/296 |
| 5,191,440 A | 3/1993 | Levine |
| 5,357,348 A | 10/1994 | Moro |
| 5,450,213 A | 9/1995 | Kobori et al. |
| 5,475,475 A | 12/1995 | Kohtani et al. |
| 5,566,278 A | 10/1996 | Patel et al. |
| 5,685,002 A | 11/1997 | Sano |
| 5,710,635 A | 1/1998 | Webster et al. |
| 5,724,157 A | 3/1998 | Otani et al. |
| 5,724,490 A | 3/1998 | Shibaki et al. |
| 5,732,161 A | 3/1998 | Kuroda et al. |
| 5,768,488 A | 6/1998 | Stone et al. |
| 5,777,753 A | 7/1998 | McShane et al. |
| 5,832,504 A | 11/1998 | Tripathi et al. |
| 5,838,325 A * | 11/1998 | Deen et al. ............ 345/353 |
| 6,079,885 A * | 6/2000 | Sano ............ 400/76 |

* cited by examiner

Primary Examiner—Kimberly A. Williams
Assistant Examiner—Saeid Ebrahimi
(74) Attorney, Agent, or Firm—Dominic J. Chiantera

(57) ABSTRACT

A method, for use with an advanced function printer, for automatically printing a source document in a print copy format having the largest acceptable print page image size on the fewest number of print copy pages.

14 Claims, 4 Drawing Sheets

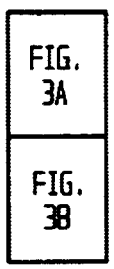

Fig. 3

| FIG. 3A |
|---|
| FIG. 3B |

70 — Given:
1. d, a source document with an unknown number of pages
2. s, a non-empty set containing each number of page images that can be rendered onto one side of paper by the printer
3. $I_{max}$, the user specified maximum number of tolerable page images that should be rendered onto one side of paper
4. P(d), E(s), and [x] functions that respectively return: a) the number of page images in document d; b) the element with the largest value within set s; c) the smallest integer that is greater than or equal to the number x

72 — Determine number of page images $I_d$ in document d: $I_d = P(d)$

74 — Initialize number of printing pages $N_p$ to infinity: $N_p = \infty$

76 — Is set s empty?  Yes / No

78 — Retrieve largest value remaining in set s: $I_{nup} = E(s)$

Fig. 3A

AUTOMATIC UP IMAGE PRINTING

TECHNICAL FIELD

This invention relates to the field of electronic printers, and more particularly to electronic printers capable of printing multiple up images.

BACKGROUND ART

As known in the art, the term page print image, or simply print image, refers to the grouping of the printable text and graphic characters of a source document into an image size that can fit onto one side of a printed page. These character groupings occur with pagination of the document and the number of characters in a grouping depends on the selected paper size, page margins, and their character font style and size.

As also known, there is a process referred to as "up imaging" in which multiple print images may be provided on one side of a page of print copy. The character count is the same as in the source document, but the font size is reduced. While the default value is usually one image per side and is referred to as "1 up", two images per side are referred to as "2 up", four per side are referred to as "4 up", and other values are similarly referenced. The reasons for using up imaging vary, but include the ability to conserve print paper, to compress document size for handling convenience, or simply as a user selected presentation style. The only limit on the number of images per side is the maintenance of an acceptable print image resolution and readability.

The present advanced function printers, such as the Lexmark[1] Model Optra S 2450, support this process. In conjunction with their software drivers, the printers offer a user several up image values which may be selected by the user from the print dialog box which appears during selection of the print command in an information processing application. The set of selectable up image values offered varies with the printer make and model. Typically the offered values include 1 (the default), 2, and 4 up imaging. The referenced Optra model offers an extended set which includes 1, 2, 4, 6, 9, and 16 up image values. As an example of its use, if a user chooses to have a four page document printed entirely on one side of a print page, the 4 up selection is made, the print driver software informs the printer that the operator has chosen a 4-UP printing function, and the printer reduces the page image font size so as to be capable of rendering them onto successive quadrants of the paper.

[1] Lexmark is a trademark of Lexmark International, Inc.

If in the above example the printer is capable of printing on both sides of a sheet of paper (referred to in the art as "Duplex printing"), the operator may improve readability while keeping the entire printed document on one piece of paper by selecting 2-Up imaging in conjunction with Duplex printing. The printer then reduces the page images of the received document to ½ size, rather than ¼ size, and renders them onto successive halves of successive sides of the sheet of paper.

However, despite the availability of n-Up imaging and Duplex printing, it is unlikely that a printer user (or operator) will know how many page images will result when a free flowing, non-paginated document (such as a Web Page) is to be printed. Consequently, operator selection of a supported n-Up printing function may not generate the largest possible image size on the fewest number of output sheets.

DISCLOSURE OF INVENTION

One object of the present invention is to provide method and apparatus for automatically printing a source document using the largest acceptable print image size in the fewest number of print pages. Another object of the present invention is to provide method and apparatus for printing non-paginated source documents in a print copy with the fewest number of print pages.

According to the present invention, a method includes the steps of determining the number of source document page images, establishing a default image size for the print document, calculating the minimum number of full sheets of print material onto which the default image size may be printed, and printing the source document in the calculated number sheets of print material. In further accord with the present invention, the default image size is quantified as the maximum acceptable number of page images per side of print sheet material.

In still further accord with the present invention, the step of calculating the number of print sheets includes choosing as a default image size, the printer up-image value which is equal to and, alternately, which is less than, the acceptable number of page images per side. In still further accord with the present invention, the number of print pages in the print document is the minimum whole number value which is equal to and, alternately, which is greater than, all ratio values resulting from division of the number of source document page images by each possible value of up image that the printer is capable of printing.

The method of the present invention is sufficiently flexible in its steps to accommodate any sized source document, and any sized set of printer up image values. It provides an automatic, default up image value which is used in connection with the total number of page images in the source document to calculate the least number of print copy pages required. The default image size may be changed by the printer user, or operator by selecting a different up image value from among the selectable values available in a given printer. The method may be embodied in firmware, in the printer operating software, or in the print driver software on the network server.

These and other objects, features, and advantages of the present invention will become more apparent in light of the following detailed description of a best mode embodiment thereof, as illustrated in the accompanying Drawing.

BEST MODE FOR CARRYING OUT THE INVENTION

Figure 1:
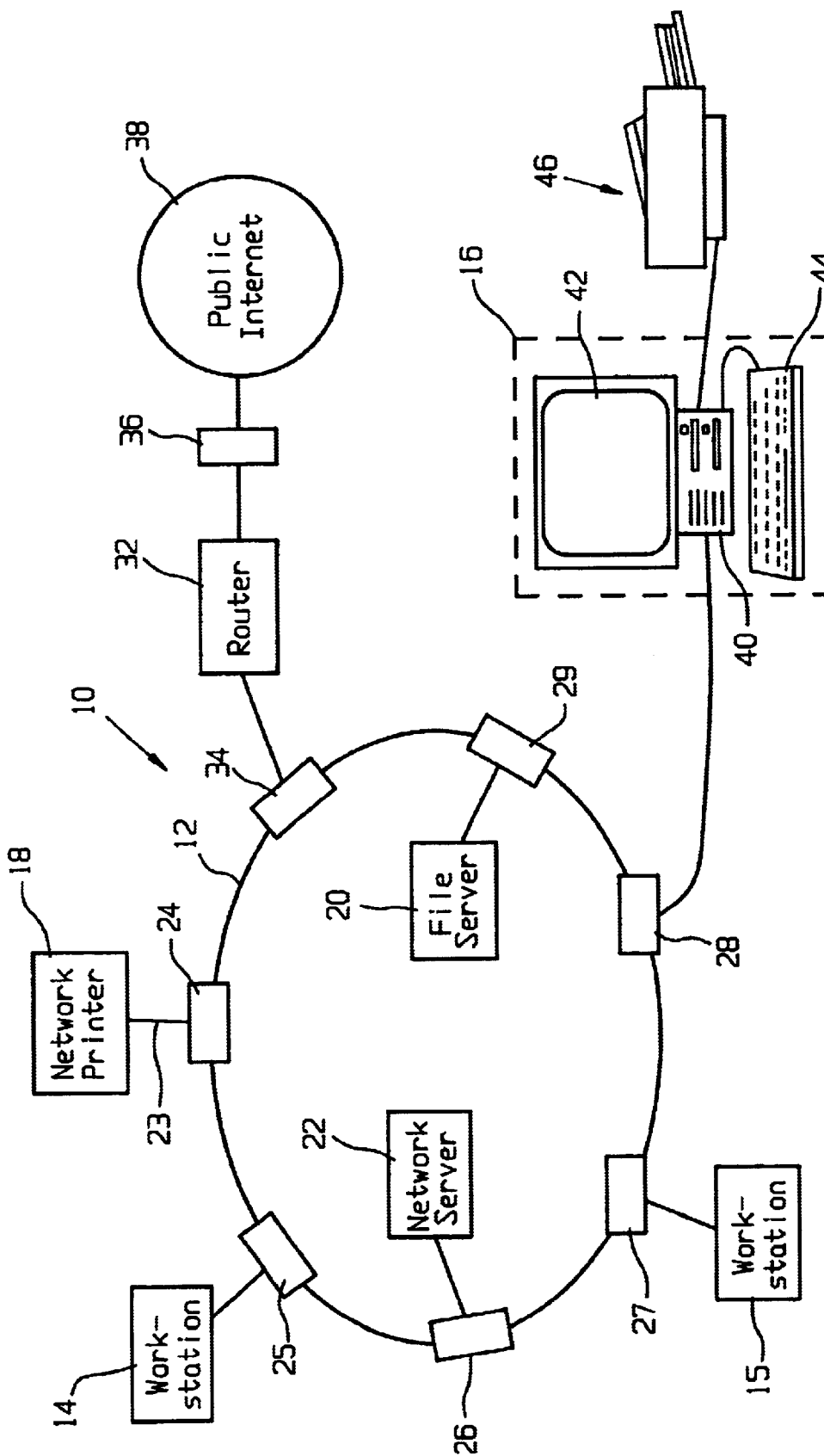
FIG. 1, is an illustrative schematic diagram of a network arrangement in which the present invention may be used.

The auto up imaging method and apparatus of the present invention may be embodied as firmware, within the printer, or as a part of the print driver software. It's applicable to local printers as well as network printers. FIG. 1 is a figurative schematic illustration of a typical local area network (LAN) 10, which may have any one of a number of known network topologies and signal protocols. The network includes a communications medium 12 which interconnects a plurality of network devices, including work stations 14–16, a network printer 18, a file server 20, and a network server 22; each connected to the network medium through associated interface devices 24–29, such as network interface cards (NICs). The devices communicate in the signal protocol established by the network operating system software installed in the network server 22. To provide for inter-networking, the network 10 is connected through a switching device 32, such as a router, and associated interface devices 34, 36, to other networks, in a wide area network (WAN) arrangement, including the public internet 38.

Each of the work stations, as shown by the workstation 16, include a computer based apparatus 40 having a user/operator viewable display 42 and an operator responsive input signaling device 44, such as a key board, mouse, or other known operator controlled device, for entering commands to the work station. The workstation computer 40 may also include a printer output port adapted for connection to a local printer 46. Through their network connections the workstations 14–16 can communicate with each other, with the network printer 18, the file server 20, the network server 22, and with outside people and resources through the public internet 38. Alternatively, the workstation may be used in a stand alone mode for local applications, such as word processing.

In all of these elected applications it is often necessary, or useful, to provide print copies of a network source document or a local station source document. For workstations such as the workstation 16, the user may also select to have the print copy provided by the local printer 42 or the network printer 18. There may be different options available in each and often times the local printer 42 may be used for proof copies of documents while the networks may provide the higher quality print copy.

Figure 2:
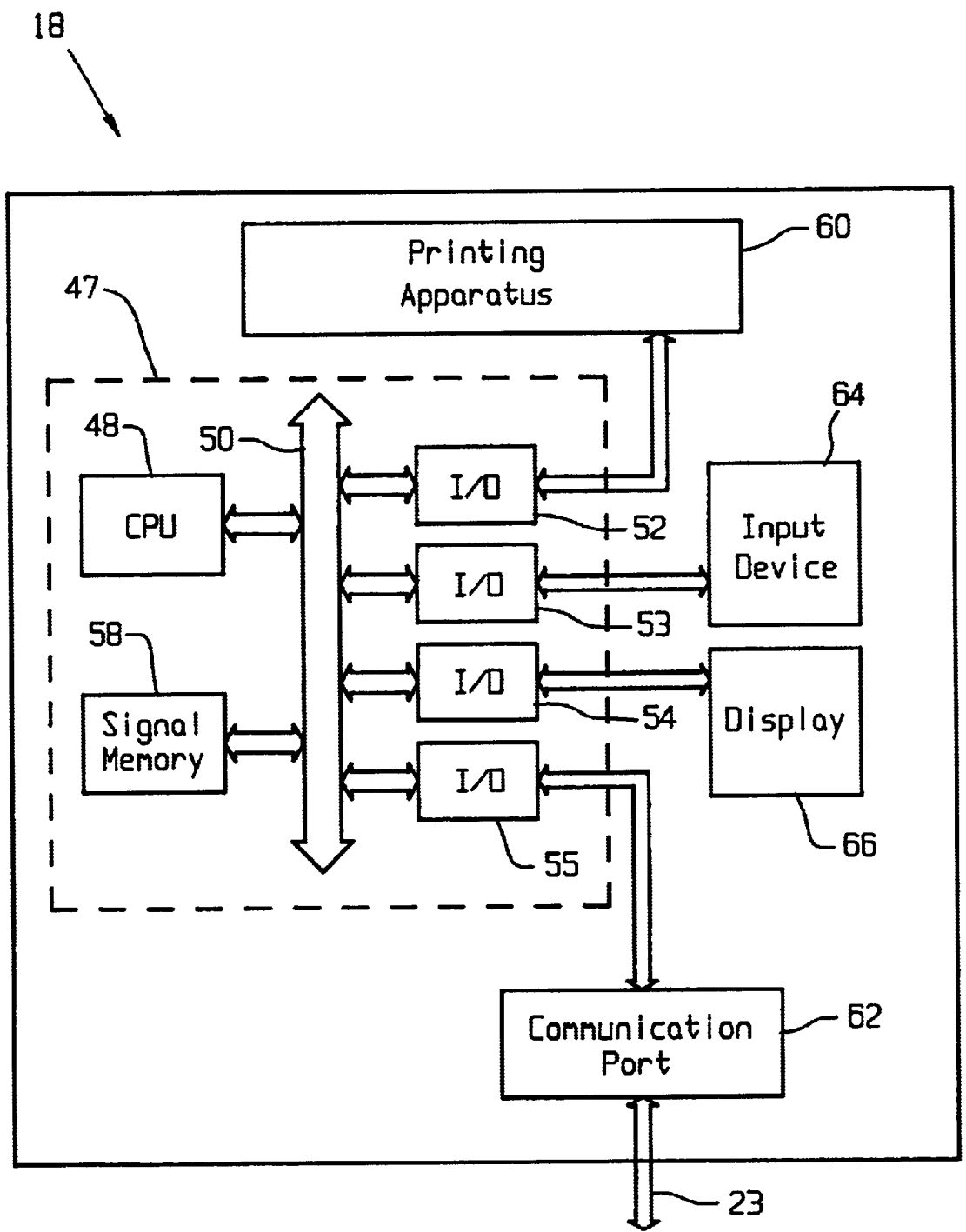
FIG. 2, is a block diagram illustration of a printer embodiment in which the present invention may be used.

FIG. 2 is a schematic diagram of the major functional elements of a printer, as shown with respect to the network printer 18, but as applicable also to the local printer 46. The printer includes a signal processor 47. The processor is of a known type, having a central processing unit (CPU) 48 connected through a signal bus 50 to a plurality of input/output (I/O) devices 52–55, and to a signal memory 58. In FIG. 2, the signal memory 58 is illustrated figuratively, but includes both volatile and nonvolatile forms of memory storage media. The memory stored signals include the electronic file format of source documents which are stored in a mapped print queue in the memory prior to printing, and including program signals which are used to control the CPU 48 in the execution of various printer functions.

The I/O devices 52–55 connect the signal processor 47 to the printer's printing apparatus 60. In FIG. 2 the printing apparatus 60 is assumed to include all of the necessary elements required to provide the rendering of the print image on the selected print material. For purposes of the present invention the printing apparatus may be any one of the various known types of print imaging functions, including laser and ink jet. The I/O devices also connect the signal processor to a communications interface 62 which receives the printers network connection cable 23, and to input device 64 and printer display 66. As known the input device 64 may include various discrete keyboard functions provided to a user which allow direct input to the printer. Similarly, the display provides the user with information with printer status.

In operation, the source documents to be printed are received by the printer through the communications interface 62, and presented through the I/O device 55 and signal bus 50 to the print queue mapped in signal memory 58.

Referring to FIG. 1, operation source documents to be printed initially reside on a workstation, such as 16. These documents are physically stored within the workstation's internal memory or within one of its associated, external storage devices such as a disk drive. When it is desired to print a source document from the workstation, an operator using a local application will indicate their intentions through input signaling device 44. The local application will then prompt the operator for various parameters used to print the source document. These parameters may include the destination for the printed document, such as network printer 18, and other formatting options, such as a value for up imaging. As known in the art, the default values for such parameters are often shown within a "dialogue box" on viewable display 42. It is within this dialogue box that optional invocation of the auto up imaging method could be selected by an operator using input signaling device 44.

Once the value of all related parameters have either been verified or altered by an operator, the source document to be printed is then optionally for-matted within the computer based apparatus 40. Such formatting may include whole or partial execution of the auto up imaging method. After being optionally formatted, the source document is then transmitted through interface device 28 onto communication medium 12 into network printer 18 through its interface device 24.

Referring to FIG. 2, an optionally formatted source document is received by a printer through communications port 62, and is presented through I/O device 55 and signal bus 50 to the print queue mapped in signal memory 58. Prior to the document being rerouted for printing from signal memory 58 through signal bus 50 and I/O device 52 to printing apparatus 60, the document may be optionally reformatted in signal memory 58 by CPU 48. Such reformatting may include whole or remaining execution of the auto up imaging method.

Figure 3B:
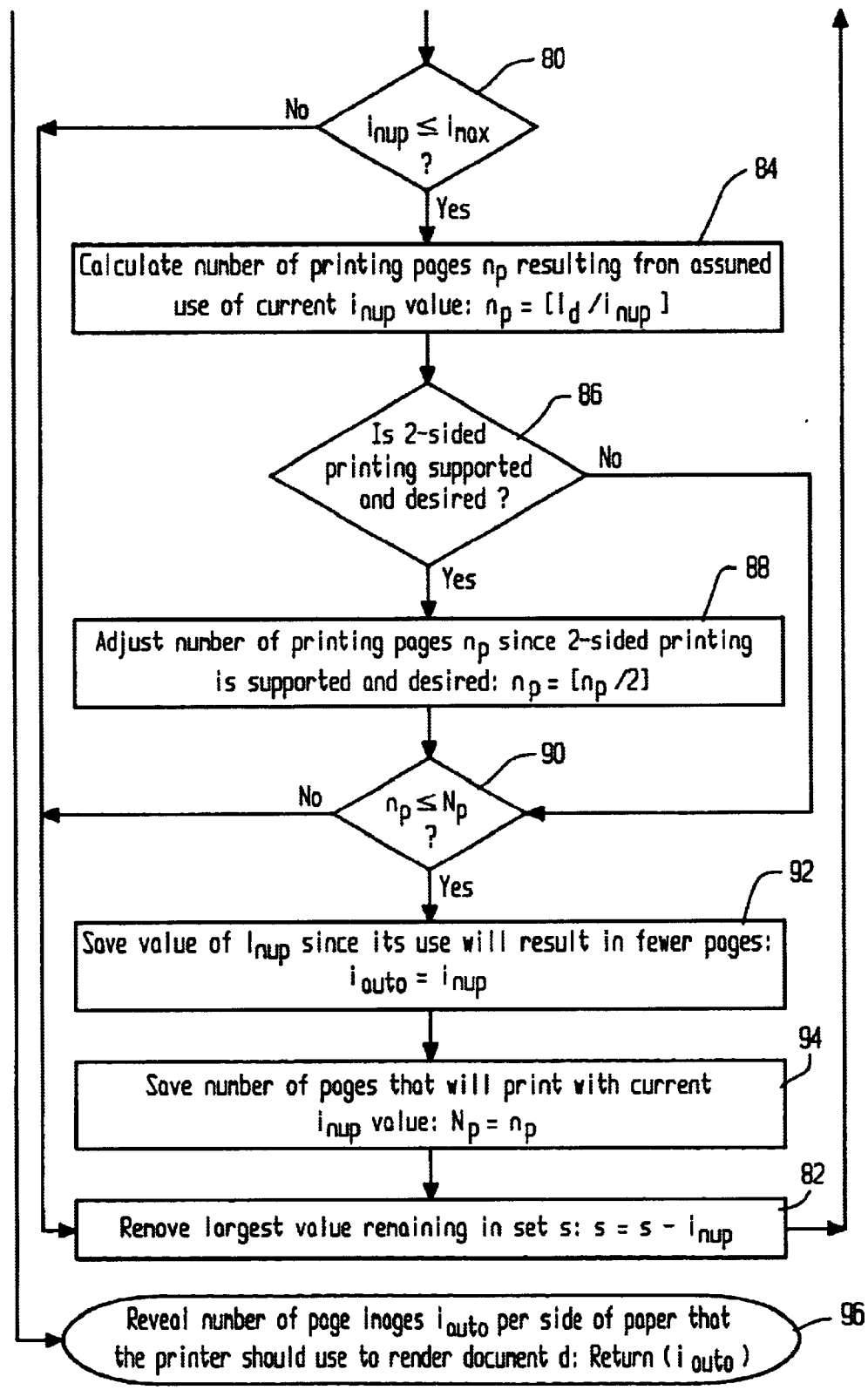
FIG. 3, is a flowchart diagram illustrating the steps performed by the invention in the printer embodiment of FIG. 2.

Referring to FIG. 3, which is a flow chart diagram of the process routine 68 which, for the example network printer, is executed wholly or partially, by the printer signal processor 47, and/or the workstation server 16, depending on the elected embodiment (software or firmware) and the installation site (workstation and/or printer) for the method. Alternatively, for the local printer 46, the method would be installed in the local printer; as in firmware. In the present description it is assumed that the method is being performed within network printer 18.

The signal processor 47 enters the routine 68 at 70, which is shown to include a description of the parameter values used in performance of the process. This description is included in the flowchart diagram of FIG. 3 only for the purpose of assisting in the teaching of the invention, and is not required for process performance. One of the step 70 listed parameters is $i_{max}$, which is identified as the maximum number of acceptable page images that should be placed on a single side of a printed sheet. Instructions 72 require the processor 47 to determine the number of pages ($I_d$) in the source document. The processor does this by retrieving the source document from memory 58 and performing a pagination process (P) using the embedded control characters of source document to determine the document pages $I_d$ thus $I_d$=P(d). Instructions 74 next require the number of pages ($N_p$) in the print copy be set at as initial value of infinity ($N_p=\infty$).

Decision 76 determines if the set of selectable integer values of up image supported by the printer has been exhausted?. If the answer is NO, then instructions 78 will use function (E) to retrieve the largest integer value presently in set s, and set the initial value $i_{nup}$ thus $i_{nup}$=E(s).

Decision 80 next determines if the value of $i_{nup}$ is less than or equal to $i_{max}$, and if NO, the process moves to instructions 82, which requires that the present value of $i_{nup}$ be removed from the selectable up image values presently available in set s, after which the process branches back to decision 76 and again performs commands 76, 78, 80 as above described.

If the answer to decision 80 is YES, instructions 84 then next calculate the number of print copy pages $n_p$ as the smallest integer value which is equal to or greater than the ratio value $I_d/i_{nup}$. This is an iterative value setting based on the corresponding present iteration value of $i_{nup}$ (where $i_{nup}$=E(s)). Decision 86 next determines if the printer supports duplex (two sided) printing. If YES, instructions 88 reset the number of print copy pages to the smallest integer value which is equal to or greater than one half the value calculated by instruction 84.

Following instructions 88, or a NO answer to decision 86, decision 90 determines if the number of print copy pages n set in instructions 84 (and optionally altered by instruction 88) is less than or equal to the present value of $N_p$? If the answer is NO, the routine branches to instructions 82, removes the present iteration value of $i_{nup}$ from set s and returns to decision 76. In such a case the iteration did not produce a print copy page number which is less than the current value of $N_p$.

If the answer to decision 90 is YES, instructions 92 saves the current value of $i_{nup}$ as the auto up value $i_{auto}$. Subsequently, instructions 94 save the current calculated print copy page value $n_p$ that would result from use of the current auto up value, thus $N_p$=$n_p$. Following instructions 94, instruction 82 again removes the present iteration value of $i_{nup}$ from set s, and the routine branches back to decision 76 to perform another iteration.

Routine 68 continues iteratively as described above until set s becomes empty as determined by decision 76. As may be evident, the value of $i_{nup}$ decreases in succeeding iterations since it is iteratively set to the succeedingly lower values returned from function E(s). As this occurs the number of print copy pages is calculated for each $i_{nup}$ value. In each case where $n_p$ is less than or equal to its prior value $N_p$ the set value of $i_{auto}$ in instructions 92 remains set at what becomes the final up image command value.

Eventually, the iterations terminate since set s becomes empty and the answer to decision 76 will become YES. When that occurs the process branches to instructions 96 which reports the up image value $i_{auto}$ that should be used by signal processor 47 to print a source document received through communication port 62 and stored in signal memory 58.

Although the invention has been shown and described with respect to a best mode embodiment thereof, it should be understood by those skilled in the art that various changes, omissions, and additions may be made to the form and detail of the disclosed embodiment without departing from the spirit and scope of the invention, as recited in the following claims.

I claim:

1. A method of printing a source document in a print format which automatically prints the largest acceptable image size on the fewest number of print material sheets, comprising:

determining the number of page images in the source document;

establishing a minimum user acceptable image size for the printer format;

selecting a printer capable of printing a selectable number of page images on a single side of print sheet material;

calculating the minimum number of full sheets of print material onto which the selected printer is capable of printing the minimum acceptable image size; and printing the source document in the calculated number of full sheets of print material;

wherein said calculating step includes the step of setting the number of pages in the print format equal to the minimum whole number value which is equal to and, alternately, which is greater than, all ratio values resulting from the division of the number of page images in the source document by each of the selectable number of page images that the printer is capable of printing.

2. The method of claim 1, where the step of establishing includes:

quantifying the minimum acceptable image size as the maximum acceptable number of page images per side of print sheet material.

3. The method of claim 2, where the step of qualifying includes:

allowing user identification of an acceptable number of page images per side of print sheet material and, alternately, using a default value therefore in the absence of such user identification.

4. A method of printing a source document in a print format which automatically prints the largest acceptable image size on the fewest number of print material sheets, comprising:

determining the number of page images in the source document;

establishing a minimum user acceptable image size for the printer format, said establishing step including the sub-step of quantifying the minimum acceptable image size as the maximum acceptable number of page images per side of print sheet material;

selecting a printer capable of printing a selectable number of page images on a single side of print sheet material;

calculating the minimum number of full sheets of print material onto which the selected printer is capable of printing the minimum acceptable image size;

printing the source document in the calculated number of full sheets of print material; and wherein said calculating step includes the sub-steps of:
      comparing the maximum acceptable number of page images which the selected printer is capable of printing per side;

identifying, as a desired value, that the selectable number of page images that the printer is capable of printing which is equal to and, alternately, which is less than, the acceptable number of page images; and setting the number of pages in the print format equal to the minimum whole number value which is equal to and, alternately, which is greater than, all ratio value resulting from the division of the number of page images in the source document by each of the selectable number of page images that the printer is capable of printing.

5. The method of claim 4, where the step setting includes:

determining the presence of a duplex printing function within the selected printer, such as to provide the printer with the capability of providing print copy images on both sides of each print page;

electing the duplex printing function in response to the determined presence thereof; and re-setting the number of pages in the print format equal to the minimum whole number value which is equal to and, alternately, which is greater than, all ratio values resulting from division of the number of page images in the source document by one half of each selectable number of page images that the printer is capable of printing.

6. A printer for printing a source document received in electrical signal file format in a print copy format which prints the largest acceptable print image size on the fewest number of print material sheets, comprising:

print apparatus, adapted for providing one or more print copies of the received source document, the print apparatus being adapted for providing a set of up image integer values, each up image integer identifying a different number of print coy page images which can be printed on a single side of print sheet material, the print apparatus providing the print copy in a print copy format commanded by a print control signal presented thereto; and a signal processor, having a signal memory for storing signals, including the source document signals, and including program signals, the program signals controlling the signal processor in:
determining the number of page images in the received source document;
establishing a minimum user acceptable print copy page image size for the print format;
calculating the minimum number of full sheets of print material onto which the selected printer is capable of printing the minimum acceptable image size; and
issuing the print control signal to the print apparatus that results in printing the source document on the calculated number of full sheets of a print material using the selected and acceptable number of page images preside of the print sheet material;
wherein said calculating step includes the step of setting the number of pages in the print format equal to the minimum whole number value which is equal to and, alternately, which is greater than, all ratio values resulting from the division of the number of page images in the source document by each of the selectable number of page images that the printer is capable of printing.

7. The printer of claim 6, where the step of establishing includes:
quantifying the minimum acceptable image size as the maximum acceptable number of page images per side of print sheet material.

8. The printer of claim 7, where the step of quantifying includes:
allowing user identification of an acceptable number of print copy page images per side to each of print sheet material an, alternately, using a default value therefore in the absence of such user identification.

9. A printer for printing a source document received in electrical signal file format in a print copy format which prints the largest acceptable print image size on the fewest number of print material sheets, comprising:

print apparatus, adapted for providing one or more print copies of the received source document, the print apparatus being adapted for providing a set of up image integer values, each up image integer identifying a different number of print coy page images which can be printed on a single side of print sheet material, the print apparatus providing the print copy in a print copy format commanded by a print control signal presented thereto; and a signal processor, having a signal memory for storing signals, including the source document signals, and including program signals, the program signals controlling the signal processor in:
determining the number of page images in the received source document;
establishing a minimum user acceptable print copy page image size for the print format, said establishing step including the step of quantifying the minimum acceptable image size as the maximum acceptable number of page images per side of print sheet material, said quantifying step including the sub-step of allowing user identification of an acceptable number of print copy page images per side to each of print sheet material an, alternately, using a default value therefore in the absence of such user identification;
calculating the minimum number of full sheets of print material onto which the selected printer is capable of printing the minimum acceptable image size; and
issuing the print control signal to the print apparatus that results in printing the source document on the calculated number of full sheets of a print material using the selected and acceptable number of page images per side of the print sheet material;
wherein said calculating step includes the sub-steps of:
comparing the maximum acceptable number of print images per side to each of the selectable number of up image integer values of the print apparatus;
identifying, as desired value, that up image integer value is which is equal to and, alternately, which is less than, the acceptable number of page images; and
setting the number of pages in the print, format equal to the minimum whole number value which is equal to and, alternately, which is greater than, all ratio value resulting from division of the number of page images in the source document by each of the selectable number of page images that the printer is capable of printing.

10. The printer of claim 9, where the step setting includes:
determining the presence of a duplex printing function within the selected printer, such as to provide the printer with the capability of providing print copy images on both sides of each print page;
electing the duplex printing function in response to the determined presence thereof; and
re-setting, in the print control signal, the number of pages in the print format equal to the minimum whole number value which is equal to and, alternately, which is greater than, all ratio values resulting from division of the number of page images in the source document by each of the selectable number of page images that the printer is capable of printing.

11. A method of printing a plurality of document pages on an optimal number of print material sheets, comprising the steps of:
providing a printer having a plurality of up image selections, each of said plurality of up image selections corresponding to an element in an up image set;
eliminating from said up image set all of said elements that exceed a predetermined maximum of up images per material sheet; and
printing the minimum number of print material sheets, while using the minimum up image selection that does not alter said minimum number of print material sheets.

12. The method of claim 11, wherein each of said elements in said up image set is an integer that corresponds to a number of images which each said up image selection would print on a single material sheet.

13. The method of claim 12, further comprising the step of calculating said minimum number of print material sheets by selecting an integer value which is the smallest integer value that is one of equal to and greater than a calculated set that results from the ratio of the number of document pages to the corresponding elements of said up image set.

14. The method of claim 13, wherein said calculating step follows said eliminating step.

* * * * *